No. 863,652. PATENTED AUG. 20, 1907.
G. M. ROSS.
CAN OPENER.
APPLICATION FILED AUG. 10, 1906.
2 SHEETS—SHEET 1.
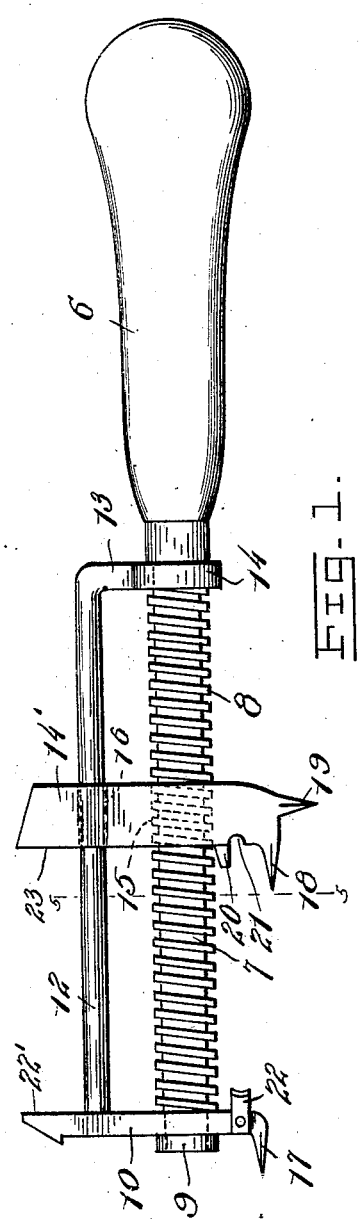
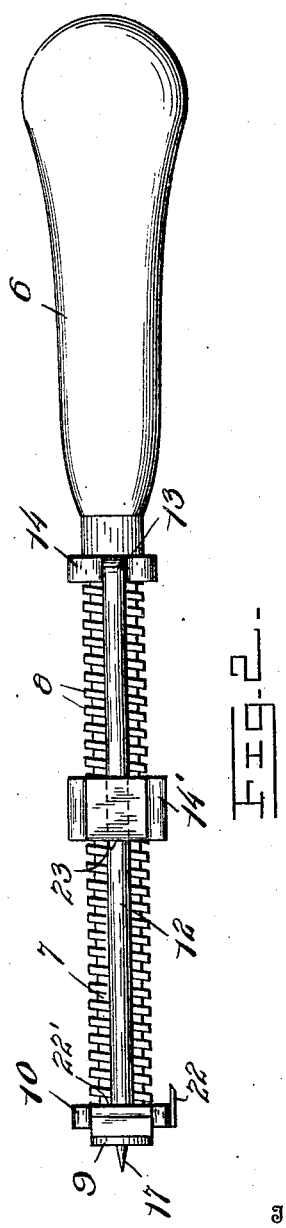
Inventor
Geo. M. Ross,
Witnesses

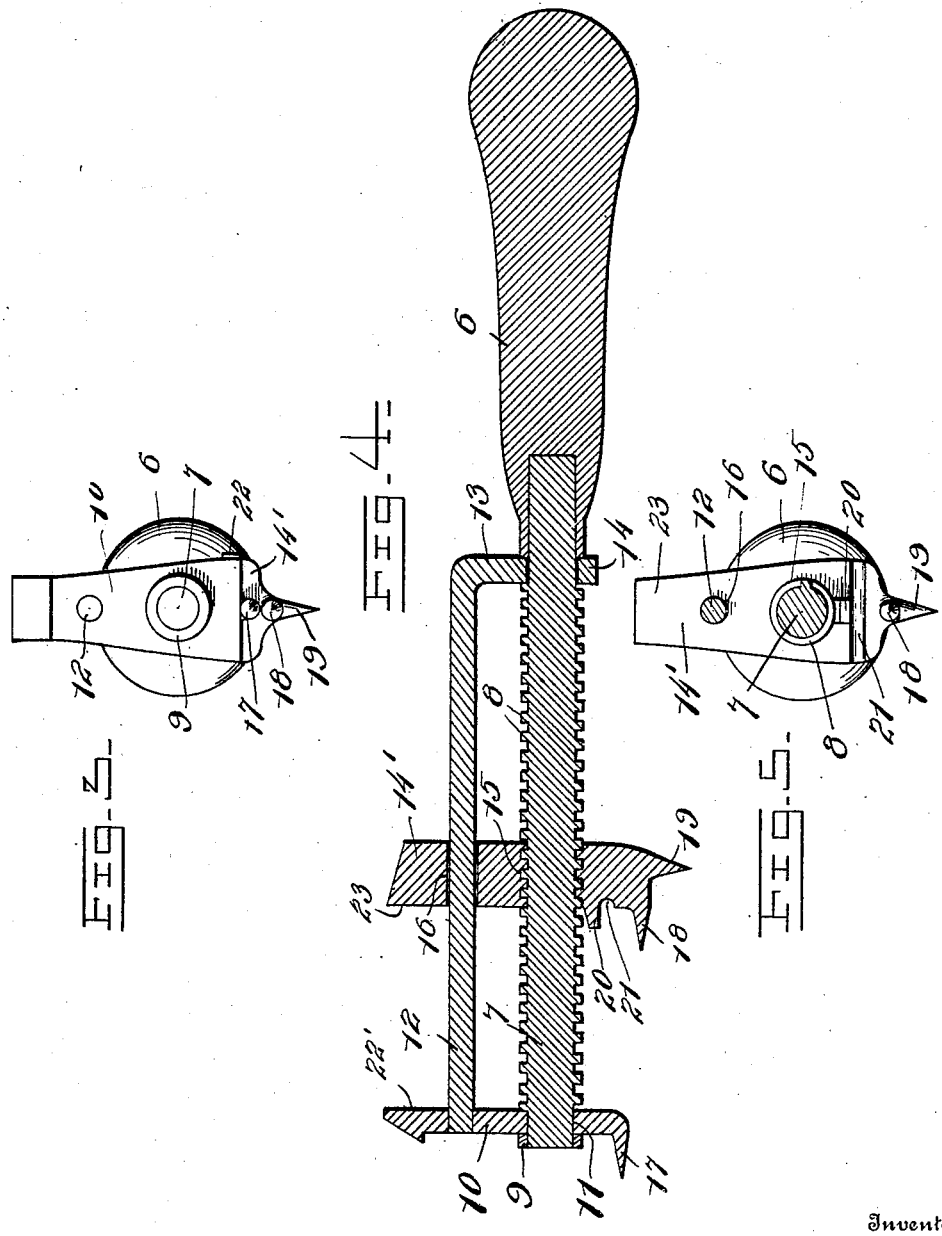

UNITED STATES PATENT OFFICE.

GEORGE M. ROSS, OF HARWOOD, MISSOURI.

CAN-OPENER.

No. 863,652.　　　　Specification of Letters Patent.　　　　Patented Aug. 20, 1907.

Application filed August 10, 1906. Serial No. 330,066.

*To all whom it may concern:*

Be it known that I, GEORGE M. ROSS, a citizen of the United States, residing at Harwood, in the county of Vernon, State of Missouri, have invented certain new and useful Improvements in Can-Openers; and I do hereby declare the following to be a full, clear, and exact description of the invention, such as will enable others skilled in the art to which it appertains to make and use the same.

This invention relates to can openers, and has for its object to provide a device of this nature which may be utilized to cut the top out of a can or to cut the entire end off of a can, as may be desired.

The invention resides in the provision of a device of this nature comprising a fixed head-plate, a movable knife-carrying block, and a handle for the tool which may be operated to move the movable block and adjust the same to suit different sized cans.

A further object of the invention is to provide means for limiting the downward movement of the tool when cutting the end off of a can, thereby insuring a perfectly straight cut.

In the accompanying drawings—Figure 1 is a side elevation of the tool. Fig. 2 is a plan view thereof. Fig. 3 is an end view of the same. Fig. 4 is a vertical longitudinal sectional view through the same, and, Fig. 5 is a detail vertical transverse sectional view on the line 5—5 of Fig. 1.

Referring more specifically to the drawings, the numeral 6 denotes the handle of the tool, and 7 a shank which is secured at one of its ends in the handle and is screw-threaded throughout its length, as at 8, except at its outer end and its point of junction with the handle 6. A collar 9 is formed at the extreme outer end of the shank 7 and upon the plain portion of this end of the shank and between the collar 9 and the threads 8 is loosely engaged a head-plate 10, there being an opening 11 formed in the plate for this purpose.

A rod 12 is secured at one of its ends to the plate 10 at a point directly above the shank 7, and extends rearwardly in spaced parallel relation thereto, as shown in Fig. 1. The rear end of the rod 12 is bent downwardly at right angles to its main portion, as at 13, is enlarged, and is provided with an eye 14 through which is engaged that portion of the shank which lies between the screw-threads 8 and the adjacent end of the handle 6.

From the foregoing it will be observed that the handle may be turned to rotate the shank 7. A knife block 14′ is provided with a threaded bore 15, is engaged upon the threaded portion of the shank, and is held against rotation therewith by means of the rod 12, which is loosely engaged through an opening 16 formed therethrough, it being understood that by this construction, when the shank is rotated as above stated, the block will be moved longitudinally thereof, toward or away from the plate 10, according to the direction of rotation of the handle 6.

A tooth 17 is formed upon the plate 10 at its lower edge and projects downwardly and thence forwardly therefrom, and is designed for insertion through the top of the can to be opened.

In order that an opening may be cut in the top of a can or the entire top cut off, the blades 18 and 19 are formed upon the block and project forwardly and downwardly respectively from the front and lower edge faces thereof, it being understood that the blade 19 is used in the first instance and the blade 18 in the second instance. Furthermore, it will be understood that when the tool is to be used to cut the entire top off of a can, the tooth 17 may be inserted therein and the handle 6 rotated to force the blade 18 into the side of the can adjacent the top thereof, the entire tool being then turned to cause the blade to cut the top therefrom.

To limit the downward movement of the tool and hold the blade 18 in the same plane while turning the same to insure an even cut, a lug 20 is formed upon the front face of the block and projects forwardly therefrom in position to rest upon the upper end of the can at its edge.

To enable the tool to be used to cut wire, the block is notched, as at 21, in its forward face for the reception of the wire and a blade 22 is formed upon one side edge of the plate 10 and extends rearwardly therefrom in position to have a shearing contact with the corresponding face of the block. The plate 10 and the knife-block 14′ are provided above the rod 12 with abrupt opposing faces 22′ and 23 respectively which permit the tool to be used as a wrench when so desired.

It is to be understotod that I do not desire to be limited to the exact details of construction shown and described, for obvious modifications will occur to a person skilled in the art.

What is claimed, is—

1. A tool of the class described, comprising a rotatable shank, a plate loosely carried at one end of the shank, a tooth formed on the lower edge of the plate, a block disposed upon the shank for movement longitudinally thereon when the shank is rotated, a guide rod extending through the block and connected at one end to the plate and at its other end loosely with the shank, a pair of blades carried by the block, a lug formed on the block, and arranged to rest upon top of a can being operated upon by the tool, a notch in the knife-block for the reception of a wire to be cut, and a blade upon the side of the end plate, extending rearwardly from it so arranged as to have a shearing contact with the corresponding face of the block, and to act upon a wire in the notch with cutting effect.

2. A tool of the class described comprising a rotatable shank, a plate loosely carried at one end of the shank, a tooth formed on one edge of the plate, a block disposed upon the shank for movement longitudinally thereon when the shank is rotated, a guide rod extending through the block and connected at one end to the plate and at its other end loosely with the shank, two blades carried by the block, a lug formed on the block and arranged to rest upon the top of a can being operated upon by the tool, a notch in the knife-block for the reception of a wire to be cut, a blade upon the one side of the end plate extending rearwardly and so arranged as to have a shearing contact with the corresponding face of the knife-block and to act upon a wire in the notch with a cutting effect, the upper ends of the knife-block and end plate being extended upwardly to form jaws.

In testimony whereof, I affix my signature, in presence of two witnesses.

GEORGE M. ROSS.

Witnesses:
H. HARELSON,
F. VICKERS.